March 31, 1970          B. D. MILLER          3,503,252
IMPACT SIGNAL DEVICE FOR SONIC TESTING
Filed Sept. 21, 1967
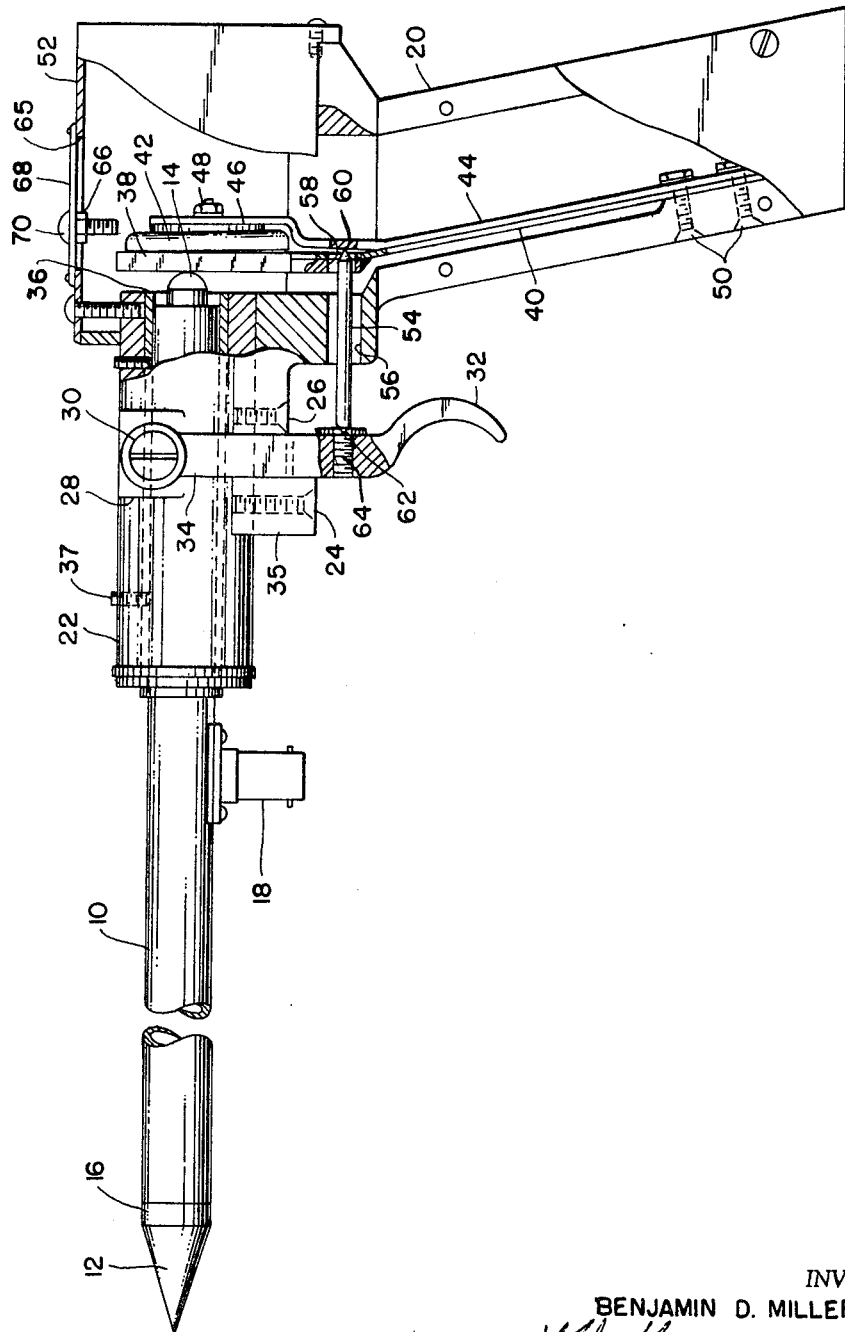
INVENTOR
BENJAMIN D. MILLER
BY
ATTORNEYS

United States Patent Office 3,503,252
Patented Mar. 31, 1970

3,503,252
IMPACT SIGNAL DEVICE FOR SONIC TESTING
Benjamin D. Miller, Dearborn, Mich., assignor to The Detroit Edison Company, Detroit, Mich., a corporation of New York
Filed Sept. 21, 1967, Ser. No. 669,625
Int. Cl. G01n 29/00
U.S. Cl. 73—71.5        10 Claims

ABSTRACT OF THE DISCLOSURE

An impact signal device comprising a probe adapted to contact the article to be tested, said probe having an electric signal transmitter connected thereto, a pistol type holder for the probe including a trigger and a spring urged hammer, and means responsive to continuous movement of the trigger to move the hammer against the spring and then to release the hammer for forward movement against the inner end of the probe.

BACKGROUND OF THE INVENTION

Sonic testing of various articles and materials has been used in which the essential condition sensed by the testing apparatus is the time required to transmit a sonic impulse. For example, the tester may compare the interval required to transmit a sonic test signal through a sound portion of a pole as compared to another portion possibly exhibiting internal decay, rot, or the like.

SUMMARY OF THE INVENTION

Briefly described, the invention comprises a pistol type holder adapted to receive an elongated probe, the outer end of which is brought into contact with the article or material to be tested. The holder includes a trigger and a hammer normally urged forwardly into engagement with the inner end of the probe. A hammer retracting or release element is provided, preferably in the form of a magnet, and means interconnect the magnet and the trigger. Upon rearward movement of the trigger the magnet is moved rearwardly, drawing the hammer rearwardly away from the rear end of the probe until the force of the hammer spring causes it to separate from the magnet at which time it moves forwardly and delivers an impact to the inner end of the probe. The probe carries an electric signal initiating device such as for example as a piezo-electric crystal device which is adapted to be connected into a suitable measuring circuit.

It is accordingly an object of the present invention to provide a simple impact device for simultaneously generating an electric signal and delivering an impact to an article or material to be tested.

More specifically, it is an object of the present invention to provide a device of the character described in which an impacting hammer is moved against the action of a spring by magnetic attraction until the force of the spring or other means is sufficient to overcome the magnetic attraction, thus releasing the hammer.

Other objects and features of the invention will become apparent as the description proceeds, especially when taken in conjunction with the accompanying drawing, illustrating a preferred embodiment of the invention.

BRIEF DESCRIPTION OF THE DRAWING

The figure is a side elevation, with parts broken away, of the impact signal device.

DESCRIPTION OF THE PREFERRED EMBODIMENT

In the figure, an elongated probe 10 is provided with a pointed end as indicated at 12 adapted to be firmly seated against an article to be subjected to sonic testing. At its inner end the probe carries an abutment 14 rounded as shown and adapted to be struck by a hammer as will subsequently be described. When an impact is thus delivered against the projection or abutment 14 at the inner end of the probe, the shock wave is transmitted longitudinally thereof and is delivered to the object engaged by the pointed end 12 of the probe. Thus, a sonic wave is initiated at the pointed end of the probe which travels through the material being tested. Suitable means are provided to receive the signal at the opposite side of the article, which may be a pole or the like, and a circuit is provided including means for measuring or comparing the interval of transmission through the article with a known interval.

In order to initiate the timing cycle an electric signal device 16 is carried by the probe and this may be a piezo crystal device (details of which may be as shown in prior copending Miller et al. application Ser. No. 384,672, filed July 23, 1964), which is adapted to be connected to external circuitry by a suitable connector 18. It will be observed that the electric signal device is closely adjacent to the probe point 12 so that the electric signal is initiated substantially simultaneously with transmission of the mechanical signal or impact to the article or material being tested.

A pistol type holder is provided for the probe 10 and comprises a handle 20 carrying a generally cylindrical barrel 22 which is secured to the handle by screws indicated at 24 and 26. The barrel 22 is generally cylindrical except for two flat bosses 28 at opposite sides thereof, which are tapped to receive trigger mounting screws 30. A trigger 32 is provided the upper end of which is bifurcated to provide arms 34 having openings receiving cylindrical portions on the screw 30, thus providing a trunnion mount for the trigger 32. The forward end of the handle 20 includes an abutment portion 35 engaged by the trigger to limit forward swinging movement thereof. The trigger is shown in the figure in its external forward position.

The barrel 22 has a cylindrical opening therethrough and receives a sleeve 36 formed of a suitable cashioning material such for example as neoprene. The probe with its cushioning sleeve 36 is retained in the barrel 22 by assembly screws 37.

A hammer 38 is provided in the hollow interior of the handle 20 and is carried by a yieldable spring arm 40. Associated with the hammer is retracting and release mechanism including a permanent magnet 42 connected to a spring arm 44 by suitable means including a shim 46 and threaded fastening means 48. The lower ends of the spring arms 40 and 44 are fixedly secured within the handle 20 by threaded fastening elements indicated at 50.

It will be observed that the adjacent flat surfaces of the hammer and magnet; that is, the rear surface of the hammer and the forward surface of the magnet, are positioned to diverge slightly so that physical contact between the two is limited to theoretical point contact adjacent the upper edge portion of the magnet. This limits the magnetic holding force applied to the hammer by the magnet to a desirable range and permits adequate flexing of the hammer spring without the application of undue force to the trigger 32.

The hammer and magnet structure is received within a hollow portion of the handle 20 which is covered by a removable sheet metal cover 52.

Means are provided for effecting rearward displacement of the magnet 42 and this means comprises a trigger pin 54 passing through an enlarged opening 56 in the handle 20. The hammer 38 and its spring arm 40 are apertured as indicated at 58 and the rear end of the pin 54 extends through this opening into a shallow recess indicated at 60 provided in the forward surface of the magnet arm 44. The forward pointed end of the pin 54 is received in a recess as indicated at 62 provided in a trigger pin guide 64 which is mounted in a threaded opening through the trigger. The pin 54 is retained in the position illustrated during operation of the device due to the resilient nature of the magnet arm 44.

The structure as thus far described may be operated by firmly contacting or embedding the pointed end 12 of the probe in the article or material to be tested, followed by a smooth rearward pull on the trigger 32. This has the result of directly displacing the magnet 42 rearwardly and due to magnetic attraction between the magnet and the hammer 38, the hammer will be drawn rearwardly until the force developed by the hammer spring arm 40 is sufficient to cause separation of the hammer from the magnet. At this time the hammer will move forwardly and impact the projection 14 at the rear end of the probe 10. This impact will be of substantially uniform magnitude since separation between the hammer and magnet will take place as a result of predetermined stressing of the hammer spring.

However, it may be in some cases desirable to provide for variably controlled impact forces. For this purpose the cover 52 may be provided with a slot 65 in which a nut 66 is longitudinally slidable but is retained against rotation. A plate 68 is similarly slotted and receives a screw 70 the lower end of which extends downwardly into the path of rearward movement of the upper end of the hammer 38. By adjusting screw 70 longitudinally of the slots, the point at which rearward movement of the hammer is terminated may be adjusted as desired. Further rearward movement of the magnet after the hammer has engaged the screw 70 results in separation between the hammer and magnet and a corresponding forward movement of the hammer with a force determined by controlled flexing of the hammer spring 40.

The drawing and the foregoing specification constitute a description of the improved impact signal device for sonic testing in such full, clear, concise and exact terms as to enable any person skilled in the art to practice the invention, the scope of which is indicated by the appended claims.

What I claim as my invention is:

1. An impact device of the character described comprising an elongated probe, a holder for the probe, a hammer carried by the holder, resilient means acting between the holder and the hammer urging the hammer toward the rear end of said probe, an electric signal generator mounted on said device to be activated by impact of the hammer against said probe, and manually operable actuating means carried by said holder and connected to said hammer operable to move said hammer away from the adjacent rear end of said probe and to release said hammer to deliver a controlled impact to the end of said probe as determined by the stressing of said resilient means, said actuating means comprising a magnet carried by said holder and engageable with said hammer and movable in a direction away from the rear end of said probe to draw said hammer therewith by magnetic attraction.

2. An impact device as defined in claim 1 in which said electric signal generator is mounted on said probe.

3. A device as defined in claim 1 in which the adjacent surfaces of said hammer and magnet are shaped to have contact only throughout an extremely limited area.

4. A device as defined in claim 1 in which the adjacent surfaces of said hammer and magnet comprise a flat first surface and a flat circular surface inclined to said flat first surface and in contact therewith at an edge of said flat circular surface.

5. A device as defined in claim 1 comprising an abutment on said holder limiting rearward movement of said hammer.

6. A device as defined in claim 5 in which said abutment is adjustable to vary the force with which said hammer impacts said probe.

7. A device as defined in claim 1 in which said holder is pistol shaped and has a barrel in which said probe is mounted and a downwardly extending handle.

8. A device as defined in claim 7, said actuating means comprising a trigger movably carried by said holder, and means connecting said trigger and magnet.

9. A device as defined in claim 8, said hammer and said magnet being carried by separate parallel spring arms providing for rearward movement thereof in unison as said trigger moves said magnet rearwardly, and independent forward movement of said hammer.

10. A device as defined in claim 9, said actuating means including a mechanical connection comprising a pin connecting said trigger and said magnet and movable through an enlarged opening in the assembly of the hammer and its spring arm.

References Cited

UNITED STATES PATENTS 1,708,262    4/1929   Davis _____ 73—82

FOREIGN PATENTS 737,719    9/1955   Great Britain.
1,027,226    4/1966   Great Britain.

CHARLES A. RUEHL, Primary Examiner

J. R. FLANAGAN, Assistant Examiner